Patented Jan. 30, 1934

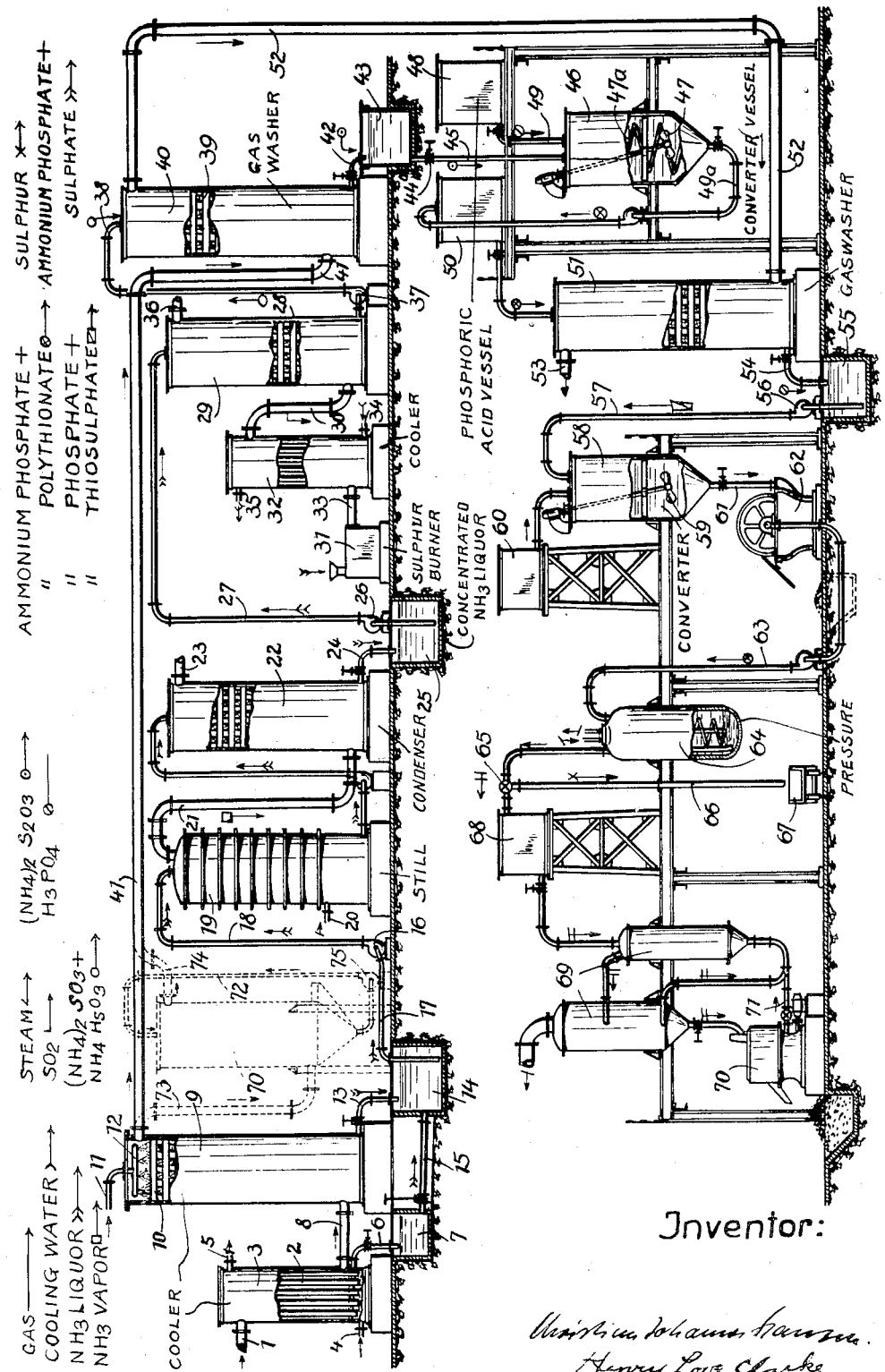

1,944,978

UNITED STATES PATENT OFFICE 1,944,978

REMOVAL OF AMMONIA AND HYDROGEN SULPHIDE FROM GASES

Christian Johannes Hansen, Essen-Ruhr, Germany, assignor, by mesne assignments, to The Koppers Company of Delaware, Pittsburgh, Pa., a corporation of Delaware Application January 25, 1932, Serial No. 588,793, and in Germany January 24, 1931

4 Claims. (Cl. 23—225)

(Granted under the provisions of sec. 14, act of March 2, 1927; 357 O. G. 5)

The invention relates to the removal of ammonia and hydrogen sulphide from gases, especially coal distillation gases, whereby the ammonium sulphate is produced from hydrogen sulphide and ammonia, and more especially to the removal of ammonia and hydrogen sulphide from the gases, whereby in addition to ammonium sulphate also ammonium phosphate is produced.

Mixtures of ammonium sulphate and ammonium phosphate are, as is well-known, excellent fertilizers, seeing the relation of the nitrogen content to the phosphorous content can be adjusted at will by an alteration in the contents of ammonium sulphate.

In my copending application Ser. No. 426,771, (now Patent No. 1,855,856) I have described a process for the recovery of such mixtures of ammonium sulphate and ammonium phosphate from the ammonia and hydrogen sulphide contained in the coal distillation gases or the like, which are thereby simultaneously freed completely from ammonia and hydrogen sulphide. In the case of the process according to my previous invention, the gas containing the hydrogen sulphide and the ammonia is brought into contact with a solution of thionates within the range of this application salts of sulphurous acids of thio-sulphuric acid and of the polythionate acids or mixtures of these salts are to be understood. Thionates react with hydrogen sulphide, forming principally ammonium thiosulphate which can be easily converted after treatment with sulphur dioxide by heating under pressure into ammonium sulphate and sulphur. In order to obtain a mixture of ammonium sulphate and ammonium phosphate, I decompose according to my former invention, the liquid containing the ammonium thiosulphate with phosphoric acid and I then heat it under pressure, without special treatment with sulphur dioxide having taken place. In consequence of the phosphoric acid, a portion of the thiosulphate is decomposed forming ammonium phosphate, sulphur dioxide and sulphur. The sulphur dioxide becoming free acts then on the remaining thiosulphate so that, when heating up under pressure, ammonium sulphate and sulphur result.

The object of my present invention is to provide an improved process for the removal of ammonia and hydrogen sulphide from gases and recovering thereby mixtures of ammonium sulphate and ammonium phosphate.

I have found that the treatment of the reacting solution in the case of the so-called thionate gas purification process not only can be carried out at the end of this process, i. e. before the decomposition of the thionates to ammonium sulphate and sulphur, but that under certain circumstances it is of advantage to effect with the phosphoric acid in the course of the process on the washing solution. As I have ascertained, one can obtain especially by the effect of phosphoric acid on thionate solution certain liquids which are suitable for the removal of hydrogen sulphides from the gas. If the effect of the phosphoric acid is allowed to continue a sufficient length of time and at suitable temperature during the treatment of the thionate solution, there is formed in addition to the ammonium phosphate and sulphur also ammonium polythionates and from the sulphur dioxide and thiosulphate a loose additional compound having a strong reaction on sulphuretted hydrogen.

The additional compound of sulphur dioxide and ammonium thiosulphate combines easily with the hydrogen sulphide. When a solution containing these compounds are brought into contact with the hydrogen sulphide, then the ammonium polythionates and the additional compound of ammonium thiosulphate and sulphur dioxide combine with the hydrogen sulphide essentially as shown in the following equations:

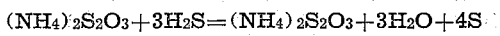
$(NH_4)_2S_2O_3 + 3H_2S = (NH_4)_2S_2O_3 + 3H_2O + 4S$

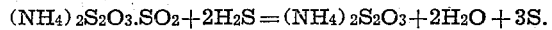
$(NH_4)_2S_2O_3.SO_2 + 2H_2S = (NH_4)_2S_2O_3 + 2H_2O + 3S.$

There results as will be seen finally in the case of this reaction ammonium thiosulphate and elementary sulphur, which may be separated out f. i. by filtering. In order to recover from the solution containing ammonium thiosulphate and the ammonium phosphate, ammonium phosphate and ammonium sulphate, the solution is treated suitably under high pressure and at a high temperature with phosphoric acid and thereupon from the salt solution after separating out the elementary sulphur formed, the solid salt mixture of ammonium sulphate and ammonium phosphate is recovered f. i. by evaporating.

The process according to my present invention offers as compared with the older process the advantage that one is able to obtain salt mixtures of ammonium sulphate and ammonium phosphate, which show a considerably higher content of ammonium phosphate than the salt mixture which was obtained in my former process. A further advantage lies in the fact that the otherwise customary treatment in the thionate process of the spent washing fluid with sulphur dioxide for the purpose of regeneration is discarded.

The practical use of my process which forms the object of the present invention depends in which way the gas purification process is carried out. It is possible to proceed in the case of the purification of coal distillation gases or the like that one works indirectly i. e. that the entire content of ammonia is removed by cooling and treatment of the gases with water before the washing out of the hydrogen sulphide. Further one may proceed in such a way that the gas before the washing out of the hydrogen sulphide is only cooled down, whereby only a portion of the ammonia is removed from the gas. This latter method is known under the term of the "semi-direct process".

In the case of an indirect process, one proceeds for instance in such a way that the entire ammonia in a concentrated form is transformed with sulphurous acid into ammonium sulphites or ammonium bisulphite or possibly in a mixture of of both. The products obtained are added to the washing solution. By acting with an acid solution on a gas containing hydrogen sulphide the bisulphite is combined with hydrogen sulphide, forming ammonium thiosulphate. The latter is rendered suitable by the simultaneous addition of phosphoric acid to take up further hydrogen sulphide.

Preferably one employs a washing process consisting of various stages, especially for the purpose of obtaining a gas free of sulphurous acid, whereby the method just described is employed in the washer which first comes into contact with the gas, whereas the one or the several following washers are in the well-known manner sprayed with a tension free ammonium sulphite-bisulphite solution for the purpose of absorbing any sulphurous acid which may possible have been taken up by the gas in the first washers, in connection with which a portion of the already formed sulphite-bisulphite can be made use of. This solution may be run off likewise to the washer which first comes into contact with the gas.

In case the process is carried out in the semi-direct form, then an ammonium bisulphite solution will be used after the first washer for the purpose of fixing the ammonia still present in the gas. As to the rest, the process is carried out exactly as in the case of the semi-direct method.

Should my present invention be employed in the case of a metal thionate gas purification process, then the phosphoric acid will be added to the ammonium thiosulphate solution freed from metal compounds and be treated for ammonium sulphate and sulphur, which thereby becomes suitable for the fixing of hydrogen sulphide and can be employed again for the purification of the gas before the decomposition under pressure of the ammonium sulphate and sulphur.

The working up of the thionate solutions resulting is effected either in such a way that they are heated up under pressure after having been previously treated with sulphurous acid for the purpose of carrying forward a portion of the thiosulphate into polythionate, whereby the thiosulphate still present is converted into ammonium sulphate, whereupon the sulphur contained already in the solution is then separated out with the new sulphur, formed by the conversion of thionate into sulphate in molten form and the clear salt solution obtained is finally evaporated off to a solid salt. However, one may remove first the sulphur from the spent washing solution possibly for example by means of filtration and then work up the clear salt solution as in the first case to ammonium sulphate or to an ammonium sulphate—ammonium phosphate mixture.

With the above and other objects of my invention in view, I will now describe the nature of my present invention on the lines of the accompanying drawing.

A contrivance is shown for carrying out of one form of the process according to this invention and this diagrammatically in a side view and partially in a longitudinal section.

In the case of the apparatus shown in the drawing, the gas containing ammonia and hydrogen sulphide is first of all led through the pipe line 1 to a cooler 3 provided with cooling pipes 2, of which the cooling pipe 2 is cooled down by a liquid, which is led through the pipe line 4 to and through the pipe line 5. On being cooled, the water contained in same is precipitated from the gas together with a portion of the ammonia in the form of gas water which flows off through the pipe line 6 to the lower end of the washer into a supply tank 7.

The cooled gas leaves the cooler 3 through the pipe line 8 and arrives at the lower end of the washing tower 9, which is provided in the usual manner with wooden hurdles 10. From above, water sprays down on to the hurdles 10 of the washer 9 which is led forward to the upper end of the washing tower to the pipe lines 11, and is distributed in the interior of the washing tower by means of perforated pipes 12 over the entire section of the washing tower uniformly.

By means of the washer which is kept in circulation by the tower 9, then the remainder of the ammonia which is still held in the gas is separated out. The ammoniacal liquor flowing off from the end of the tower 9 through the pipe line 13 to an underground tank 14, in which also the ammoniacal liquor collecting in the tank 7 arrives through the pipe line 15.

From the underground tank 14, the gas water is sucked through the pipe line 17 by means of the pump 16 and carried forward through the pipe line 18 to a usual distilling column in which the ammoniacal liquor is preferably heated up by the direct supply of steam through the pipe line 20, lime being added as desired. From the gas liquor, the entire contact of ammonia i. e. the free as well as the fixed ammonia is driven off. The ammonia vapours go then by means of the pipe line 21 into the tower 22, where they can be condensed to a concentrated ammoniacal liquor containing about 12% $NH_3$. The waste vapours escape from the tower 22 through the pipe line 23, whereas the concentrated ammoniacal liquor collecting at the bottom of the washer 22 flows through the pipe line 24 into an underground tank 25.

From the tank 25, the ammoniacal liquor is led forward by means of the pump 26 through the pipe line 27 to a washing tower 29 provided with usual wooden hurdles 28 and is distributed at the upper end of same over the entire section of the washer by means of a similar contrivance like that for the cooling water in the washing tower.

From below roast gas contained in the washing tower 29, $SO_2$ is passed through the pipe line 30, which is produced in a sulphur burner. Before the gas containing sulphur dioxide passing into the washing tower 29, it goes through a gas cooler 32, which is connected by the pipe line 33 with the sulphur burner. To the cooling tower 32, which is suitably formed as a tubular cooler, the cooling water is carried forward by the pipe line 34 and is led off through the pipe line 35.

The tower 32 can with advantage be used in order to separate out of the roasting gas the sulphur trioxide (SO₃) by bringing the gas into contact with sulphuric acid.

In the tower 29 the sulphur dioxide is combined with the ammonia contained in the ammoniacal liquor, a mixture of ammonium sulphite and ammonium bisulphite being formed, which as is well-known does not show any ammonia or any sulphur dioxide tension. In consequence the waste air from the tower 29 which passes off through the pipe line 36 contains neither ammonia nor sulphur dioxide.

The ammonium sulphite—ammonium bisulphite solution is then delivered from the tower 29 by means of a pump 37 through the pipe line 38 to the upper end of the washer 40 provided with wooden hurdles 39. In the washer 40, the gas containing hydrogen sulphide and after having been freed from ammonia in the cooler 4 and the washing tower 9 is introduced from below. To this purpose the tower 40 is connected up by the pipe line 41 with the upper end of the washing tower 9.

On the gases containing hydrogen sulphide coming into contact with the ammonium sulphite—ammonium bisulphite solution the hydrogen sulphide combines with the ammonium bisulphite forming ammonium thiosulphate and sulphur. The spent washing solution leaves the tower 40 by the pipe line 42 and reaches the tank 43. From the tank 43 the pipe line 45 controlled by the valve 44, the solution is led forward to a vessel 46 periodically, which is fitted with a stirring contrivance 47 and with pipe coil 47a for passing through a cooling fluid.

To the spent solution, phosphoric acid is added in the vessel 46 which flows in from a storage tank 48 by the pipe line 49 into the vessel 46.

Phosphoric acid and ammonium sulphite is converted in the vessel 46 into ammonium phosphate, sulphur dioxide being simultaneously formed which combines with the ammonium thiosulphate contained in the solution on the formation of ammonium polythionate and sulphur.

The proportion of phosphoric acid added depends of course on the amount of thiosulphate and polythionate in the spent liquor. Enough phosphoric acid is of course added to react with all of the thiosulphate in the spent liquor. As pointed out in my aforesaid patent all of the thiosulphate will not be converted to ammonium phosphate but only part thereof, the remaining part being ultimately converted to ammonium sulphate. As is pointed out herein, the SO₂ generated by the phosphoric acid converts the remaining part of the thiosulphate that is not converted to phosphate, into polythionate. The proportions of phosphoric acid thus may be determined empirically from the examples given in my aforesaid patent and the specific example hereinafter given. Ammonium sulphate does not form at this stage of my process since the cooling coil 47a keeps the temperature below that required to form ammonium sulphate, as is pointed out in the specific example hereinafter given.

After completion of the reaction, the solution is led forward through the pipe line 49a to an intermediate vessel 50, from which it arrives at the upper end of the washing tower 51, in which the gas to be cleaned still containing hydrogen sulphide is introduced from below through the pipe line 52 which stands in connection with the upper end of the tower 40.

On the bringing into contact of the washing fluid in the washing tower 51 containing the ammonium tri-thionate with the gas containing hydrogen sulphide, the hydrogen sulphide is absorbed by the ammonium thionate forming thiosulphate and sulphur. The gas which has now been freed from ammonia and hydrogen sulphide leaves the washing tower 51 by means of the tower 53. The spent washing fluid passes then through the pipe line 54 into an underground tank 55, from which it is led forward by means of a pump 56 through the pipe line 57 to an intermediate tank 58 which is fitted with a stirring contrivance 59. The reaction fluid is decomposed in the tank 58 with phosphoric acid out of the storage tank 60. Thereupon the reaction mixture is led forward by the pipe line 61 to a filtering contrivance, for instance a continuous drum-shaped filter 62 in which the entire unsoluble matter is removed from the fluid. The clarified solution arrives now through the pipe line 63 into an autoclave 64 in which it is heated up at temperatures above 150° under pressure, whereby the polythionate and the thiosulphate are decomposed into ammonium sulphate and sulphur as described in my aforesaid patent. The sulphur collects at the bottom of the autoclave 64 and can be led off by means of pipe line 66 into the sulphur solidifying boxes 67 and this by suitable adjustment of the three-way-cock 65. As soon as the sulphur from the autoclave 64 has been pressed out, the cock 35 is adjusted and the clear solution containing phosphate and sulphur is carried forward to the storage tank 68 from which it periodically is led off to a usual evaporating contrivance 69. In the contrivance 69, the salt solution is evaporated off to form crystals, and the crystals resulting are separated out from the mother liquor in the centrifugal 70, which returns by means of the pipe line 71 into the evaporator.

Under certain circumstances, it may be necessary to remove, in addition to the ammonia and hydrogen sulphide, also the cyanogen compounds. In this case, as shown in dotted lines on the drawing, the gas is passed from the washing tower 9 through the pipe line 73 to washing tower 70, in which the gas is brought into contact with an ammonia polysulphide solution.

The washing solution flows through the tower 70 from above downwards and then is, by means of the pump 25, carried forward with the circulation through the pipe line 72 to the upper end of the tower 70.

The gas freed from the cyanogen compounds leaves the washing tower 70 by means of the pipe line 74, which is connected up with the pipe line 41, leading to the washer 40.

The working of the contrivance shown by the drawing for carrying out the process according to this invention is approximately as follows:

It is assumed that a gas has to be cleaned which contains per cubic meter 10.55 grams H₂S and 8.5 grams of NH₃ and that of this gas 100,000 m³ are to be cleaned per 24 hours.

From the gas the entire ammonia is first of all separated out by cooling to 30° and by washing with water, which is then worked up at the usual manner to the concentrated ammoniacal liquor with 12% NH₃. There results 7080 kilos NH₃ liquor with a percentage of 850 kilos NH₃. The ammoniacal liquor is then treated with 2130 kilos SO₂, whereby 9210 kilos of a solution which contains a mixture of 1920 kilos ammonium sulphite and 1650 kilos ammonium bisulphite. The gas to be cleaned and freed from NH₃ is washed with this solution in washer 39, whereby the bisulphite connects up with 566 kilos H₂S forming 1232 kilos ammonium thiosulphate and 533 kilos sulphur.

The solution running off from the washer 39 is now decomposed in vessel 46 at 25° C. slowly with 2920 kilos phosphoric acid, whereby from the spent liquor of the original ammonium sulphite, 497 kilos SO₂ and 1730 kilos mono-ammoniumphosphate result, and the sulphur dioxide then converts the remaining 738 kilos thiosulphate in the spent liquor to 1138 kilos ammoniumtrithionate and 161 kilos sulphur.

After these reactions have been completed the gas still containing hydrogen sulphide is washed in washer 51 with the reaction solution from vessel 46 during which washing by means of the ammonium polythionate, 489 kilos H₂S is removed from the gas forming 738 kilos ammonium thiosulphate and 639 kilos sulphur. The resulting solution is decomposed with 545 kilos phosphoric acid in vessel 58 and then the entire unsoluble matter is filtered off. Thereupon, the solution is warmed up in the autoclave 64 for 4 hours to 160° C., whereupon 734 kilos ammoniumsulphate and 639 kilos monoammoniumphosphate result together with 356 kilos sulphur.

The sulphur is divided off in solid form from the fluid, which is then evaporated, whereupon 3093 kilos of a salt mixture of 734 kilos ammonium sulphate and 2359 kilos monoammoniumphosphate result.

The contrivance shown on the drawing, may also serve for the use of the process according to this invention for the known removal of the ammonia and hydrogen sulphide from gases by means of ammoniumpolythionate solutions or by means of ironthionate solutions which is easily understood by those skilled in the art. I do not wish my invention to be confined to the manner of carrying out, described in the foregoing, inasmuch as the invention may be varied within the scope of the claims hereinafter made.

I claim:

1. The method for removing ammonia and hydrogen sulphide from gases for the purpose of recovering useful admixtures therefrom, comprising bringing into contact the gas with a solution of a thionate to remove hydrogen sulphide from the gas treating the spent washing solution with phosphoric acid to form ammonium phosphate and ammonium thionate therefrom, and washing the gas with the liquid thereby formed to remove hydrogen sulphide from the gas.

2. The method for removing ammonia and hydrogen sulphide from gases for the purpose of recovering useful admixtures therefrom, comprising separating out of the gas ammonia, treating such ammonia with sulphur dioxide thereby forming a solution containing thionate, bringing into contact the gas with said solution to remove hydrogen sulphide from the gas, treating the spent washing solution with phosphoric acid to form ammonium phosphate and ammonium thionate therefrom, and washing the gas with the liquid thereby formed to remove hydrogen sulphide from the gas.

3. The method of removing hydrogen sulphide from gases containing the same comprising, treating a solution of ammonium thiosulphate with phosphoric acid to form ammonium phosphate and ammonium thionate therefrom, and washing the gas with the liquid thereby formed to remove hydrogen sulphide from the gas.

4. The method of removing hydrogen sulphide from gases containing the same comprising, washing the gas with a solution of thionate to remove hydrogen sulphide from the gas, regenerating the spent liquor from said washing by treating it with phosphoric acid to form ammonium phosphate and thionate and returning the so regenerated liquid for further washing of gas to remove hydrogen sulphide therefrom.

CHRISTIAN JOHANNES HANSEN.